United States Patent [19]

Calhoun

[11] 4,080,846
[45] Mar. 28, 1978

[54] MACHINERY GUARD
[75] Inventor: Albert J. Calhoun, Scarborough, Canada
[73] Assignee: Glentworth Manufacturing Inc., Scarborough, Canada
[21] Appl. No.: 773,900
[22] Filed: Mar. 3, 1977
[51] Int. Cl.² ............................................. F16P 3/04
[52] U.S. Cl. ...................................... 74/615; 83/397; 100/53
[58] Field of Search ..................... 83/397, 397.1, 398; 74/615, 613; 100/53; 72/389
[56] References Cited
U.S. PATENT DOCUMENTS

| 1,125,257 | 1/1915 | Benton | 74/615 |
| 2,463,334 | 3/1949 | Wargas | 74/615 |
| 3,186,256 | 6/1965 | Reznick | 74/615 |
| 3,687,060 | 8/1972 | Komori et al. | 100/53 |
| 4,030,364 | 6/1977 | Atwood | 100/53 X |

FOREIGN PATENT DOCUMENTS 780,573   8/1957   United Kingdom .................. 74/615

Primary Examiner—Willie G. Abercrombie
Attorney, Agent, or Firm—Sim & McBurney

[57] ABSTRACT

This invention provides a safety guard for pressing apparatus such as a brake press, in which shield plates are positively and securely maintained in the "guard" position adjacent the usual ram of the brake press. Upon descent of the ram, an interlocking tooth arrangement which is instrumental in holding the shield plates in the "guard" position is disconnected, and a swing lever is pivoted about a point fixed with respect to the frame of the brake press, at the same time raising the shield plates to allow for the bending sheet metal to "whip" upwardly during the bending. The interlocking tooth arrangement consists of one tooth on the lever and another tooth on a dog member which is mounted for pivotal motion with respect to the frame of the brake press. A contact portion is adapted to descend along with the ram, and a contact portion first cams the dog member out of the way, and then presses against the lever to rotate the same and thus lift the shield.

10 Claims, 3 Drawing Figures

MACHINERY GUARD

This invention relates generally to safety guards for power-driven machinery, and has to do more particularly with a safety guard particularly adapted for use on power brakes, punch presses and the like.

BACKGROUND OF THIS INVENTION

A power brake is a machine utilized for bending sheet metal. Commonly, a power brake includes a ram member carrying a male die part, the latter being movable toward and away from a female die part mounted on a fixed bed. Typically, the female die part defines an upwardly open channel. When the machine is used to make a bend in a piece of sheet metal, the portion of the sheet metal in front of the die swings upward very quickly, this movement being referred to in the trade as a "whip".

It is desirable to provide some means for ensuring that the operator of a machine of this type will not, through inadvertence or mistake, insert a finger or hand between the die parts just as the ram member is descending.

Several different methods have been used to accomplish this safety feature in the past. For example, it is known to provide a machinery operator with wrist bands that are attached to cables connected behind or above the operator at some fixed point. The cables are of such a length that they prevent the operator from moving his hands into the machinery. The primary disadvantage of guard of this type is that many workers simply will not wear them.

It is also known to provide a guard in the form of two switches that must be simultaneously depressed by both hands of the operator before the machine will operate. This guard system, although satisfactory, cannot be used with a piece of machinery which requires the operator to hold the workpiece in position while it is being operated upon by the machine. This is often the case with a brake press. For example, where a brake press is being used to fold sheet metal into a box, the operator must hold the sheet metal during the bending operation or it will simply fall out of the machine.

It is known to provide a safety guard in the form of a downwardly depending and vertically movable sheet of plastic or the like, positioned normally to partly block the opening through which sheet metal is fed to a brake press, as disclosed for example in U.S. Pat. No. 3,186,256, L. Reznick, issued June 1, 1965 and entitled "Safety Guards for Brakes, Punch Presses and Similar Machines".

A typical disadvantage of prior art safety guards suspended from the machine itself, however, is that there has been no provision for preventing the operator from simply taking hold of the safety guard and raising it or pulling it out of the way prior to operation of the machine to bend the sheet metal. Hence, such prior art safety guards do not constitute a positive deterrent preventing the operator from mangling his hands and fingers.

Accordingly, it is an aspect of this invention to provide a safety guard for brake presses and similar machines, which is positively retained in the "guard" position until the machine is operated, and which upon operation of the machine is automatically raised upwardly to allow for the "whip" movement of the projecting portion of the sheet metal.

GENERAL DESCRIPTION OF THIS INVENTION

Accordingly, this invention provides, for use with a pressing apparatus which includes a ram member adapted to reciprocate vertically with respect to a fixed frame means, a safety guard comprising: shield means adjacent the ram member, lever means pivoted to said fixed frame means, connection means interconnecting the said lever means and the shield means such that swinging movement of the lever means in one direction raises the shield means, and swinging movement of the lever means in the other direction lowers the shield means, contact means movable with the ram member and adapted to contact the lever means and swing the same in said one direction as the ram member descends, thereby raising the shield means, detent means adapted to move between a first position in which it restrains the lever means against movement in said one direction and a second position in which it allows movement of the lever means in said one direction, and displacement means which, on descent of the ram member, moves said detent means to its second position.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
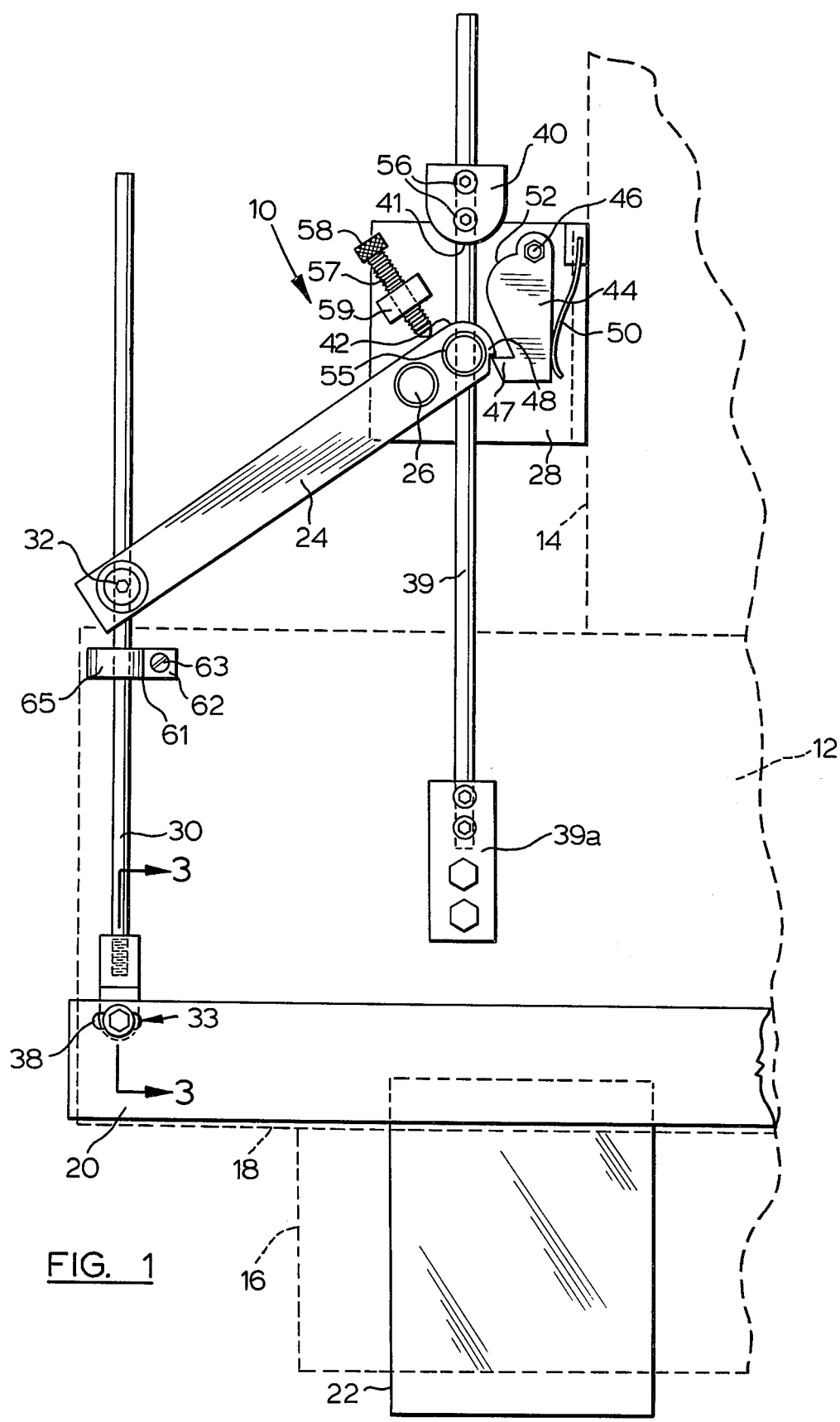
FIG. 1 is a partial frontal view of the essential components of a safety guard, with the guard in its lowermost, operative position.

Attention is first directed to FIG. 1, in which the solid line representations illustrate a portion of a safety guard apparatus 10, which is operatively interconnected with two main portions of a pressing apparatus such as a brake press, these portions being shown in broken lines as a ram member 12 which is adapted to reciprocate vertically, and a fixed frame 14. Thus, the fixed frame 14 is stationary while the ram member 12 is adapted to reciprocate vertically with respect to the fixed frame 14. The means by which the ram member 12 is supported and reciprocated are not illustrated in the drawings, as they are conventional and do not form any part of this invention. In a typical brake press machine, a male die 16 is removably affixed to the underedge 18 of the ram member 12.

The safety guard apparatus 10 includes a horizontally extending crosspiece 20 having at least one shield 22 depending downwardly therefrom. Preferably the shield 22 is of plexiglas, or a similar transparent but rigid material. The shield or shields 22 are positioned such that they prevent the operator from passing his hand into proximity with the male die 16, whenever the guard apparatus is in the condition shown in FIG. 1, with the shield or shields 22 in the lowermost "guarding" position. With the shields preferably of transparent material, the operator may view the machine operation.

In FIG. 1 only the leftward end of the crosspiece 20 is illustrated. It is to be understood that the mechanism now to be described, illustrated only over the leftward end, is reversed and duplicated at the other, rightward end of the crosspiece 20. Because of the exact duplication of the mechanism, it is not considered necessary to show both ends. The mechanism illustrated above the leftward end of the crosspiece 20 is intended to positively hold the crosspiece 20 and its depending shields in the lowermost "guard" position until the machine is activated to cause the ram member 12 to descend. Upon descent of the ram member 12, the positive retention of the crosspiece in the position shown in FIG. 1 is removed, and the crosspiece is quickly raised to allow for the sheet metal to "whip" upward during the bending operation.

The apparatus shown in FIG. 1 thus includes lever means constituted by an elongated member 24 which is pivoted at the point 26 to a bracket 28 which is in turn fixed with respect to the fixed frame 14. Thus, in effect, the lever means is pivotable about a point fixed with respect to the frame 14.

Connection means are provided to interconnect the elongated member and the shield means constituted by the crosspiece 20 and the shields 22. More particularly, the connection means includes a connecting link 30 which is pivoted at the point 32 to a location on the elongated member 24 which is spaced from the pivot point 26 thereof. The connecting link 30 is also pivoted at the location 33 to the end of the crosspiece 20, this assembly being best shown in FIG. 3.

Figure 3:
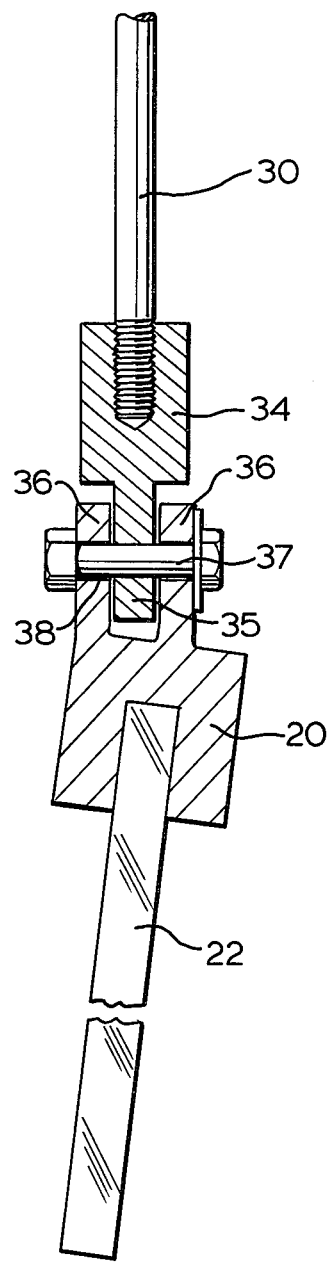
FIG. 3 is a section taken at 3—3 in FIG. 1.

In FIG. 3, it is seen that the connecting link 30 has a lower threaded end which is screwed into a connector member 34 which in turn has a depending tongue 35 received between parallel upstanding flanges 36 of the crosspiece 20. A bolt 37 functions as a pivot pin for pivotally securing the member 34 to the crosspiece 20, the bolt passing through horizontally elongated slots 38 in the flanges 36.

The other end of the elongated member 24 (i.e. the end which is remote from the connecting link 30 with reference to the pivot point 26) is adapted to be pushed downwardly by a contact means which is movable with the ram member 12. More particularly, the contact means includes a substantially vertical rod member 39 which is connected through a bracket 39a to the ram member 12 and thus is movable therewith in the vertical direction, and which supports an adjustable contact member 40 which exhibits a contact surface 41 on its underside, the surface 41 being adapted to come into contact with the end 42 of the elongated member 24 as the rod member 39 moves downwardly at the time of the descent of the ram member 12.

A detent means is provided for restraining the elongated member 24 against a clockwise pivotal motion from the position illustrated in FIG. 1, until the time of the descent of the ram member 12. More particularly, the detent means includes a dog member 44 which is pivoted at the point 46 to the bracket 28. As can be seen in FIG. 1, the dog member 44 defines a tooth 47 which is adapted to engage a tooth 48 on the end 42 of the elongated member 24, so as to mechanically interfere with and prevent clockwise pivotal movement of the elongated member 24 so long as the dog member 44 is in the position shown in FIG. 1. A resilient leaf spring 50 resiliently biases the dog member 44 clockwise about the point 46 into the position shown in FIG. 1.

Figure 2:
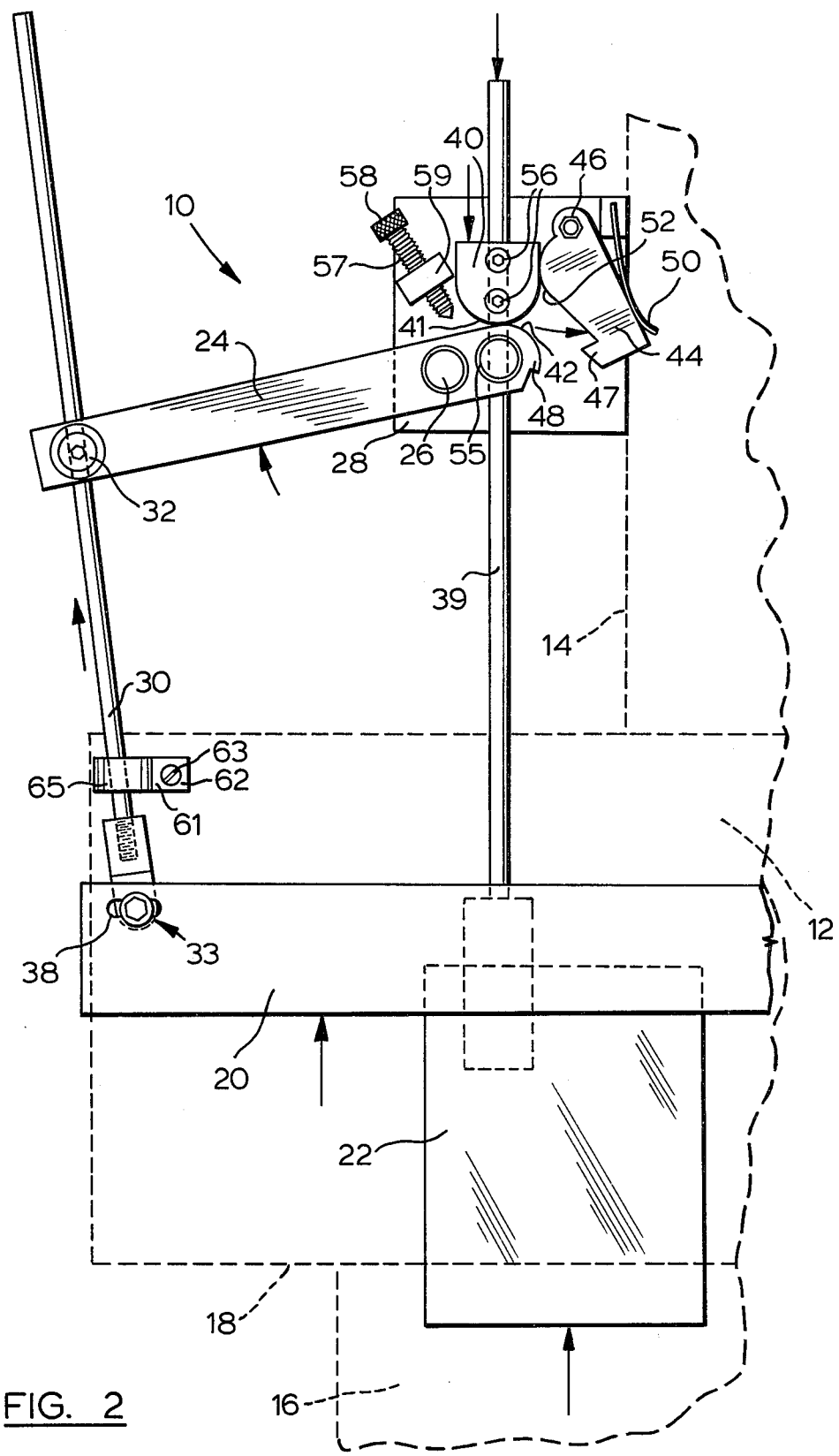
FIG. 2 is a view similar to FIG. 1, showing the guard in the raised position.

The dog member 44 has a cam surface 52 which is positioned such that it can be contacted by the contact surface 41 of the contact member 40 upon descent of the rod member 39 along with the ram member 12. The result is that the dog member 44 is cammed out of the way in the counter-clockwise rotational direction to the position shown in FIG. 2, thus withdrawing the tooth 47 from engagement with the tooth 48 and freeing the elongated member 24 to rotate in the clockwise direction about the pivot point 26 when the same is contacted by the contact surface 41 of the contact member 40 affixed to the rod member 39. Upon contact between the contact member 40 and the end 42 of the elongated member 24, the resultant clockwise rotation of the elongated member 24 raises the connecting link 30 to the position shown in FIG. 2, thus lifting the crosspiece 20 together with its attached depending shields 22. The upper end of the rod member 39 is guided through a bushing 55 which is mounted in the end 42 of the elongated member 24, thus ensuring that contact between the contact surface 41 of the contact member 40 and the end 42 of the elongated member 24 will always repeat at the same point in the descent of the ram member 12. The position of the contact member 40 may be adjusted along the rod member 39 by fastening members 56.

An adjustable threaded screw member 57 with a knurled head 58 for manual rotation engages an internally threaded bracket 59 affixed to the bracket 28, and determines the furthest counter-clockwise rotational position of the elongated member 24 through contact with the same as illustrated in FIG. 1. Thus, adjustment of the screw 57 will adjust the lowermost position of the crosspiece 20, although engagement of the teeth 47 and 48 will constitute a lower limit to such adjustability range.

A supporting bracket 61 has a flange 62 fastened to the ram member 12 by a fastening member 63, and curved finger portion 65 having a C-shape and defining an opening with the ram member surface. The connecting link 30 passes through this opening, and thus the bracket 61 ensures that the shields 22 and crosspiece 20 cannot be drawn outwardly away from the ram member 12 by the operator.

I claim:

1. For use with a pressing apparatus which includes a ram member adapted to reciprocate vertically with respect to a fixed frame means, a safety guard comprising:

shield means adjacent the ram member;

lever means pivoted to said fixed frame means, connection means interconnecting the said lever means and the shield means such that swinging movement of the lever means in one direction raises the shield means, and swinging movement of the lever means in the other direction lowers the shield means, contact means movable with the ram member and adapted to contact the lever means and swing the same in said one direction as the ram member descends, thereby raising the shield means, detent means adapted to move between a first position in which it restrains the lever means against movement in said one direction and a second position in which it allows movement of the lever means in said one direction, and displacement means which, on descent of the ram member, moves said detent means to its second position.

2. The invention claimed in claim 1, in which the lever means is an elongated member pivoted at an intermediate point to the frame means, the connection means including a connecting link pivoted to the elongated member at a location spaced from said intermediate point and also pivoted to said shield means.

3. The invention claimed in claim 2, in which the end of the elongated member which is remote from said connecting link is adapted to be pushed downwardly by said contact means, the latter including a substantially vertical rod member connected to said ram member and movable therewith in the vertical direction, the rod member supporting a contacting surface adapted to push downwardly against said last-mentioned end of the elongated member upon downward movement of the ram member, thereby to raise the other end of the elongated member along with the connecting link and the shield means attached thereto.

4. The invention claimed in claim 3, in which said detent means includes a dog member pivoted to the frame means for swinging movement between said first and second positions, said dog member in said first position having a portion which mechanically interferes with a part of said elongated member and prevents movement thereof in said one direction.

5. The invention claimed in claim 4, in which said rod member is slidably guided by said end of the elongated member which is remote from said connecting link, the rod member having attached thereto a contact member exhibiting said contacting surface, the contact member being so disposed that it cams the dog member from said first to said second position as the ram member descends.

6. The invention claimed in claim 5, in which the shield means includes a crosspiece and at least one transparent shield depending from said crosspiece.

7. The invention claimed in claim 6, in which there are two connecting links as defined, the links being pivoted to opposite ends of said crosspiece each connecting link being operatively connected to its own respective elongated member, rod member and dog member, all as defined.

8. The invention claimed in claim 5, in which an adjustable threaded member is disposed for adjusting the position of the elongated member corresponding to the lowermost position of the shield means.

9. The invention claimed in claim 5, in which the dog member is resiliently biased toward said first position.

10. The invention claimed in claim 2, which further includes bracket means retaining the connecting link in close proximity to the ram members, thereby preventing the shield means from being drawn forwardly away from protecting relation with the ram member.

* * * * *